(No Model.)
O. L. DANFORTH.
FRUIT GATHERER.
No. 469,880. Patented Mar. 1, 1892.
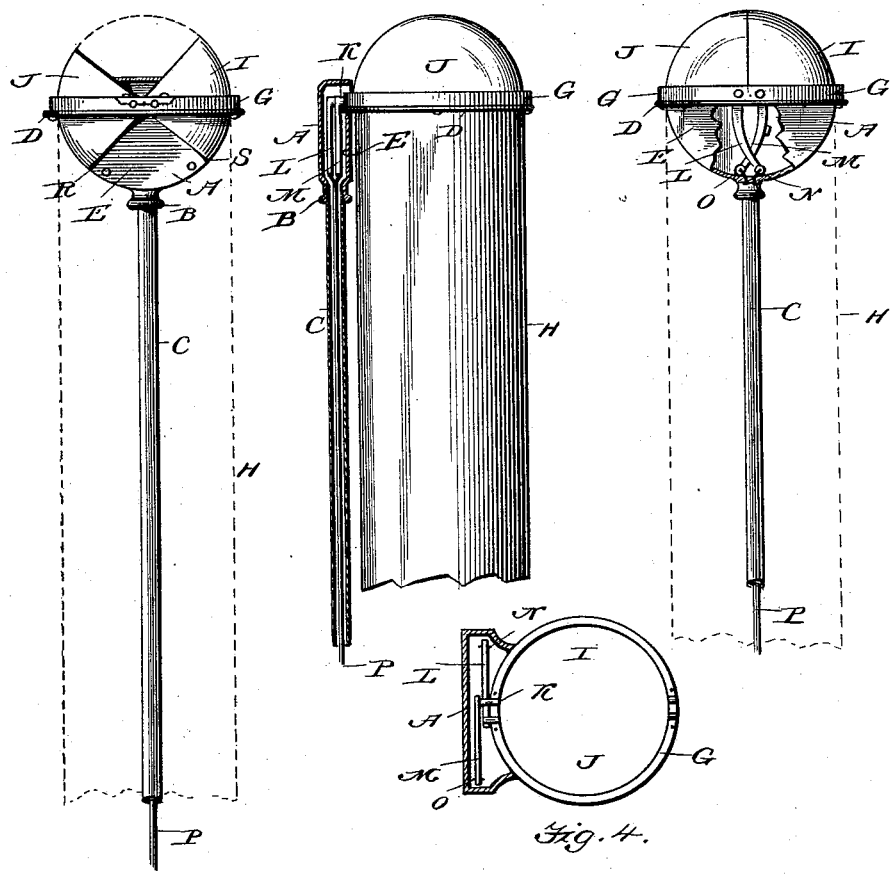

UNITED STATES PATENT OFFICE.

OSCAR L. DANFORTH, OF MANSFIELD, OHIO.

FRUIT-GATHERER.

SPECIFICATION forming part of Letters Patent No. 469,880, dated March 1, 1892.

Application filed December 7, 1891. Serial No. 414,288. (No model.)

*To all whom it may concern:*

Be it known that I, OSCAR L. DANFORTH, a citizen of the United States, residing at Mansfield, in the county of Richland and State of Ohio, have invented certain new and useful Improvements in Fruit-Gatherers; and I do declare the following to be a full, clear, and exact description of the invention, such as will enable others skilled in the art to which it appertains to make and use the same.

My invention relates to improvements in fruit-gatherers.

The objects of my invention are, first, to provide a perfect device for picking fruit; second, to so construct the same that instead of breaking the stem of the fruit the stem will be cut; third, to construct a conductor or chute for the fruit, when cut, to convey the same to the ground; fourth, to so construct the fruit-gatherer that it will be cheap, durable, and efficient in operation. I attain these objects by the mechanism illustrated in the accompanying drawings, in which—

Figure 1 is a front view of my invention with the front of the case broken away, showing the position of the operating-levers when the shears are closed. Fig. 2 is a side view of same, showing the general construction of my invention. Fig. 3 is a front view showing the hollow quarter-spherical-shaped cutters partially open to receive the fruit. Fig. 4 is a top view of same, showing the shears open and the position of the operating-levers when the shears are in that position.

Similar letters refer to similar parts throughout the several views.

In the accompanying drawings, A indicates a metallic case, which is flat upon the sides and top. The bottom of said case is half-circular in form. Attached to or forming part of the bottom of the case is the threaded sleeve B, in which is secured the hollow pole or handle C. The pole may be made in sections to make it any length to suit the operator.

D is a ring, which is attached to or forms part of the front plate E.

G indicates a metallic ring, which is placed upon the ring D and held in position by screws. The object of making the ring in two sections is for the purpose of clamping the mouth of the chute H between the two rings D and G. This device holds the flexible chute H from becoming detached from the picker-head. The chute is of the same circumference as the inside of the rings.

Pivoted or journaled upon each side of the ring G are the hollow quarter-spherical-shaped cutters I and J. The ends of the journals which pass within the case A are provided with the levers L and M. The objects of these levers are for the purpose of operating the cutters I and J. Attached to the ends of the levers are cords N and O, which may be of any flexible material. The said cords extend downward through the sleeve B into the handle C and are connected to the end of a wire P. The object of this connection is to operate both the cutters at the same time, so as to bring the plane of the cutting-edges of the cutters perpendicular when closed. The quarter-spherical cutters are tapered from their backs to a cutting-edge, and when closed, as shown in Fig. 1, the cutting-edges pass one by the other, forming a shear cut. When the cutters are fully open, the backs R S of the cutters come together, forming a hollow circular cup.

I have shown in Fig. 3 a representation of fruit attached by its stem to a branch for the purpose of showing how the fruit is gathered, which I will explain in the operation. The operator places the hollow cup formed by the cutters when opened against the under side of the fruit. The operator pulls downward upon the wire P, the wire having a connection to the levers L and M, which rotate the cutters I and J. The action of the cutters cuts the stem which attaches the fruit to the branch, the fruit passing downward through the chute H to the ground.

Having fully described my invention, what I claim as new, and desire to secure by Letters Patent, is—

1. In a fruit-gatherer, the combination of a hollow pole or handle, a cutter or picker head composed of a hollow case provided at the bottom with a threaded sleeve, a ring composed of two parts projecting from the face of the said case, hollow quarter-spherical-shaped cutters journaled in the said ring, levers secured to said journals and operated by a wire passing through the hollow pole or handle, and a flexible chute secured to the under side of the picker-head, substantially as shown and described.

2. In a fruit-gatherer, the combination of a hollow pole or handle C, a cutter or picker head secured upon the said pole and composed of a hollow case A, provided upon its lower end with a threaded sleeve B, an outwardly-projecting ring composed of two parts D and G, and hollow quarter-spherical-shaped cutters I and J, journaled in said rings and provided with levers L and M, said cutters operated by the rod or cord P, substantially as shown and described.

In testimony whereof I affix my signature in the presence of two witnesses.

OSCAR L. DANFORTH.

Witnesses:
I. S. DONNELL,
F. A. ACKERMAN.